(12) United States Patent
Le et al.

(10) Patent No.: US 11,312,495 B2
(45) Date of Patent: Apr. 26, 2022

(54) COMPACT SEAT ASSEMBLY FOR A VEHICLE

(71) Applicant: THE BOEING COMPANY, Chicago, IL (US)

(72) Inventors: Gary Tien Le, San Dimas, CA (US); Matthew Vu Hoang, Westminster, CA (US); Wade DeLaney, Costa Mesa, CA (US); Elijah Dobrusin, Long Beach, CA (US); Thomas Rodolph Eaton, Los Angeles, CA (US); Zeke Johnson, Los Angeles, CA (US)

(73) Assignee: THE BOEING COMPANY, Chicago, IL (US)

( * ) Notice: Subject to any disclaimer, the term of this patent is extended or adjusted under 35 U.S.C. 154(b) by 50 days.

(21) Appl. No.: 16/709,197

(22) Filed: Dec. 10, 2019

(65) Prior Publication Data

US 2021/0061472 A1 Mar. 4, 2021

Related U.S. Application Data

(60) Provisional application No. 62/893,993, filed on Aug. 30, 2019.

(51) Int. Cl.
*B64D 11/06* (2006.01)
*B64D 11/00* (2006.01)

(52) U.S. Cl.
CPC .... *B64D 11/0638* (2014.12); *B64D 11/00151* (2014.12); *B64D 11/0627* (2014.12)

(58) Field of Classification Search
CPC .......... B64D 11/0638; B64D 11/00151; B64D 11/0627
See application file for complete search history.

(56) References Cited

U.S. PATENT DOCUMENTS 9,610,879 B2 * 4/2017 Zheng
2019/0283644 A1 * 9/2019 Smith

OTHER PUBLICATIONS https://blog.alaskaair.com/alaska-airlines/guest-experience/new-cabin-interior/.

* cited by examiner

*Primary Examiner* — Anthony D Barfield
(74) *Attorney, Agent, or Firm* — The Small Patent Law Group LLC; Joseph M. Butscher

(57) ABSTRACT

A seat assembly for a vehicle includes a backrest. A tray table is moveably coupled to the backrest. The tray table is configured to be moved between a stowed position and a deployed position. A literature pocket is formed in the backrest. The literature pocket is disposed between the tray table in the stowed position and a rear surface of the backrest. In an embodiment, a device support is moveably coupled to the literature pocket. The device support is moveable between a support stowed position and a support deployed position that is configured to support a device.

20 Claims, 10 Drawing Sheets

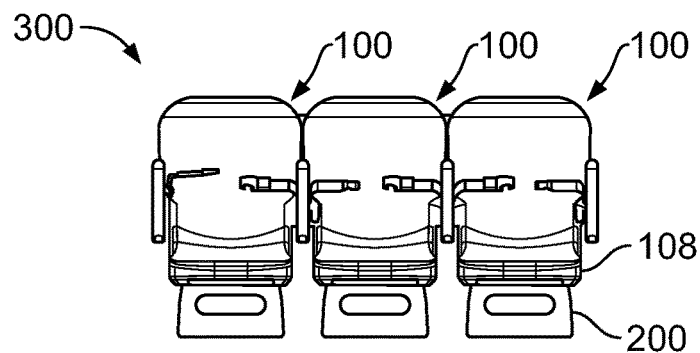
FIG. 12
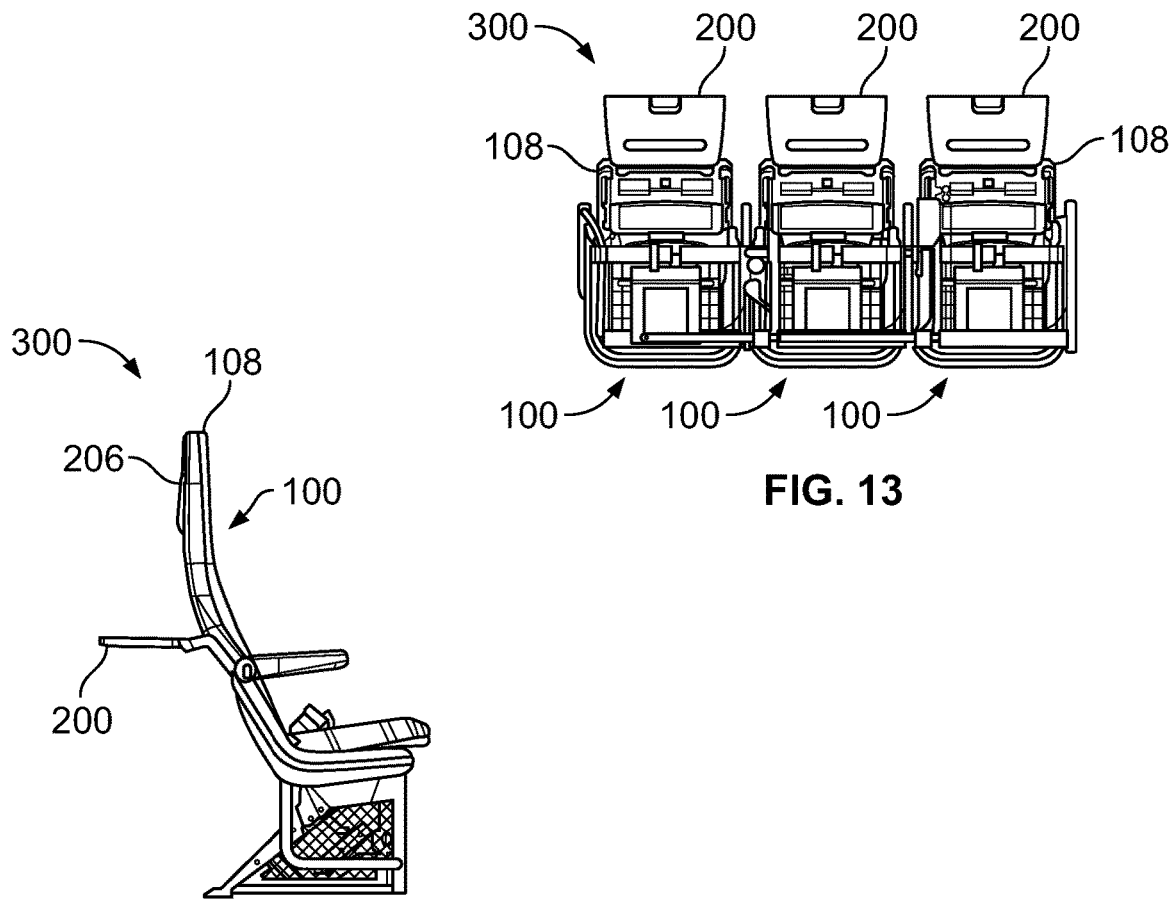
FIG. 13
FIG. 14

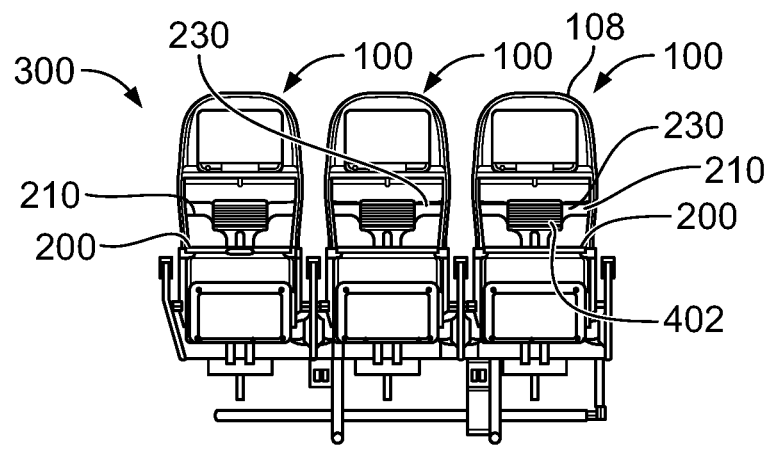
FIG. 15
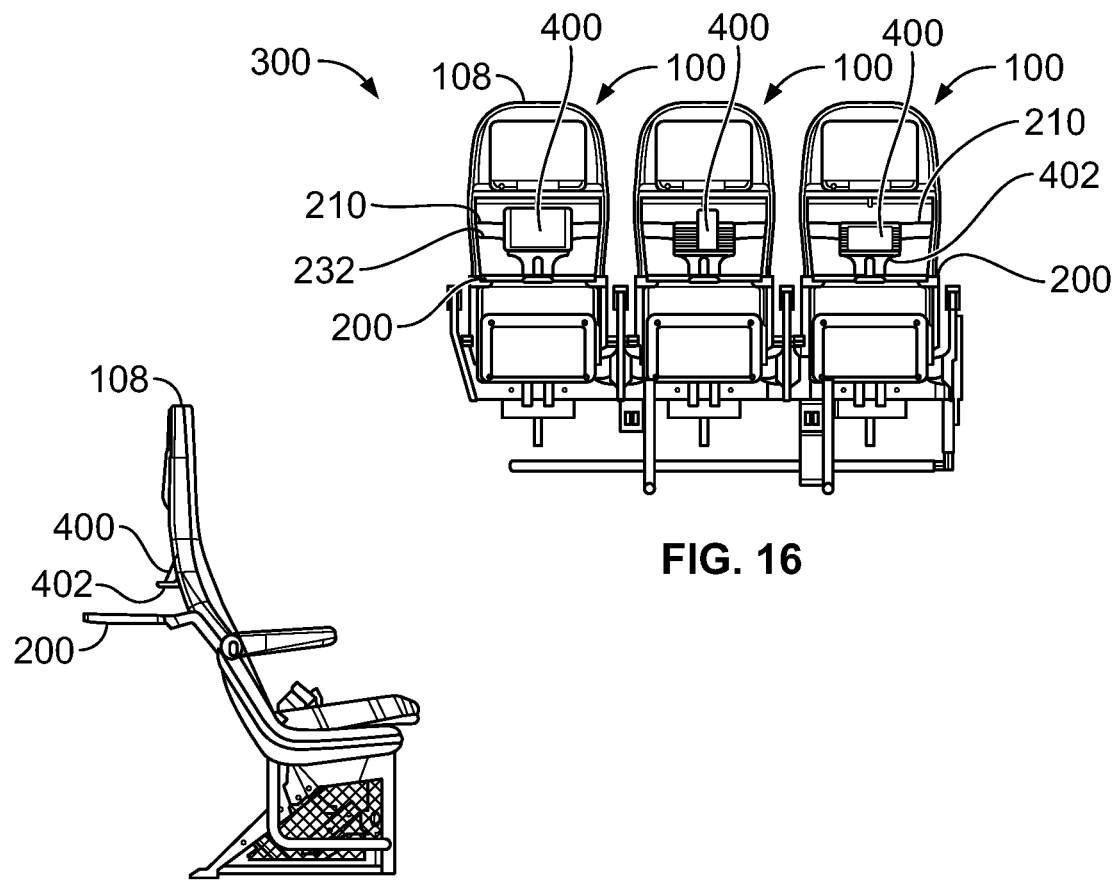
FIG. 16
FIG. 17

COMPACT SEAT ASSEMBLY FOR A VEHICLE

RELATED APPLICATIONS

This application relates to and claims priority benefits from U.S. Provisional Patent Application No. 62/893,993, entitled "Compact Seat Assembly for a Vehicle," filed Aug. 30, 2019, which is hereby incorporated by reference in its entirety.

FIELD OF EMBODIMENTS OF THE DISCLOSURE

Embodiments of the present disclosure generally relate to a seat assembly, and more particularly, to a compact seat assembly within an internal cabin of a vehicle, such as a commercial aircraft.

BACKGROUND OF THE DISCLOSURE

Commercial aircraft typically include an internal cabin that may be divided into numerous sections. A cockpit is generally separated from a passenger cabin, which may include a first class section, a business class section, an economy section, and the like. Each section within a passenger cabin may have a different spacing or pitch between rows of seats. For example, a first class section typically has a greater pitch between rows of seats as compared to an economy section.

A typical seat assembly within an internal cabin of an aircraft includes a tray table on a rear portion. The tray table is configured to be selectively stowed and deployed by a passenger seated on another seat assembly behind the seat assembly. Certain seat assemblies also include a monitor above the tray table, as well as a literature pocket below the tray table.

As can be appreciated, the space within an internal cabin is limited. Accordingly, the tray table, monitor, and pocket, which are spaced apart from one another, are generally limited in size.

Further, the tray table, monitor, and pocket add size to the seat assembly. Each seat assembly within an internal cabin occupies a defined amount of space. The space occupied by the tray tables, monitors, and pockets of numerous seat assemblies may prevent other structures, such as additional rows of seats, from being located within the internal cabin.

In order to provide a seat assembly having a tray table, a monitor, and a literature pocket, known designs typically compromise size (for example, smaller occupant amenities sizes), include a bi-folding tray table (which impacts occupant space in order to provide an adequate, table area once deployed), and/or position the literature pocket at a lower aft portion of the seat assembly, thereby reducing space for passengers.

SUMMARY OF THE DISCLOSURE

A need exists for a compact seat assembly for a vehicle. Further, a need exists for a seat assembly that occupies less space within an internal cabin of a vehicle than currently known seat assemblies. Also, a need exists for a seat assembly that provides a larger monitor, for example.

With those needs in mind, certain embodiments of the present disclosure provide a seat assembly for a vehicle. The seat assembly includes a backrest. A tray table (such as a single leaf tray table) is moveably coupled to the backrest. The tray table is configured to be moved between a stowed position and a deployed position. A literature pocket is formed in the backrest. The literature pocket is disposed between the tray table in the stowed position and a rear surface of the backrest.

The seat assembly may also include a monitor coupled to the backrest. The monitor may be above the literature pocket.

In at least one embodiment, the literature pocket is covered by the tray table in the stowed position. The literature pocket is exposed when the tray table is in the deployed position.

Certain embodiments of the present disclosure provide a seat assembly for a vehicle. The seat assembly includes a backrest. A tray table is moveably coupled to the backrest. The tray table is configured to be moved between a tray stowed position and a tray deployed position. A component is coupled to the backrest. A literature pocket is formed in the backrest. The literature pocket is disposed between the tray table in the tray stowed position and a rear surface of the backrest.

In at least one embodiment, the literature pocket is below the component. In at least one embodiment, the literature pocket is covered by the tray table in the tray stowed position, and exposed when the tray table is in the tray deployed position.

The component may include a monitor above the literature pocket. The tray table may be a single leaf tray table.

In at least one embodiment, the literature pocket is defined within a volume recessed into a rear surface of the backrest. For example, the volume is defined, at least in part, by interior lateral wall surfaces, an interior lower wall surface, and an interior upper wall surface of the rear surface of the backrest.

The literature pocket may include a holding bracket that spans across the volume. A retaining cavity is defined between interior surfaces of the holding bracket, the interior lateral wall surfaces, the interior lower wall surface, and the rear surface of the backrest.

In at least one embodiment, the literature pocket is contained within a profile of the backrest. The tray table in the tray stowed position may not extend outwardly past a profile of the backrest.

In at least one embodiment, the seat assembly also includes a device support moveably coupled to the literature pocket. The device support is moveable between a support stowed position and a support deployed position that is configured to support a device. The device support may be pivotally coupled to the literature pocket. Optionally, the device support may be slidably coupled to the literature pocket.

Certain embodiments of the present disclosure provide a seat assembly for a vehicle. The seat assembly includes a backrest. A tray table is moveably coupled to the backrest. The tray table is configured to be moved between a tray stowed position and a tray deployed position. A device support is moveably coupled to a literature pocket. The device support is moveable between a support stowed position and a support deployed position that is configured to support a device.

BRIEF DESCRIPTION OF THE DRAWINGS

FIG. 12 illustrates a top view of the seating module including the seat assemblies having the tray tables in deployed positions.

FIG. 13 illustrates a bottom view of the seating module including the seat assemblies having the tray tables in deployed positions.

FIG. 14 illustrates a lateral view of the seating module including the seat assemblies having the tray tables in deployed positions.

FIG. 15 illustrates a rear view of a seating module including seat assemblies having tray tables in deployed positions, according to an embodiment of the present disclosure.

FIG. 16 illustrates a rear view of the seating module including the seat assemblies having the tray tables in deployed positions and devices supported on deployed device supports.

FIG. 17 illustrates a lateral view of the seating module including the seat assemblies having the tray tables in deployed positions and a device supported on a deployed device support.

DETAILED DESCRIPTION OF THE DISCLOSURE

The foregoing summary, as well as the following detailed description of certain embodiments, will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide a seat assembly for a vehicle that includes a component (such as a monitor, forward head rest, device mount, or the like) within a space in an upper aft surface of a back of the seat assembly. That is, the component is coupled to the upper aft surface of the back of the seat assembly. A literature pocket is disposed between a tray table (such as in a stowed position), and a rear surface of the backrest, thereby improving living space within the internal cabin and reducing the size and profile of the seat assembly. The literature pocket is exposed when the tray table is in the deployed position. The literature pocket is below the component that is coupled to the upper aft surface of the back of the seat assembly.

Embodiments of the present disclosure provide a seat assembly that allows for a larger single leaf food tray table to be packaged with a component, such as a larger in-seat video monitor, and an upper literature pocket, thereby increasing occupant living space as compared to a bi-fold table (which is a split two-piece assembly that is configured to be unfolded and is relatively heavy, as compared to a single leaf tray table), or placing a literature pocket below the tray table, such as at knee level.

Certain embodiments of the present disclosure provide a vehicle seat assembly including a volume within a seat profile, a tray table that fits within the seat profile in a stowed position, and an interior pocket (such as a bracket) for receiving literature. The interior pocket is disposed between the tray table in a stowed position, and a rear surface of a backrest of the seat assembly.

Figure 1:
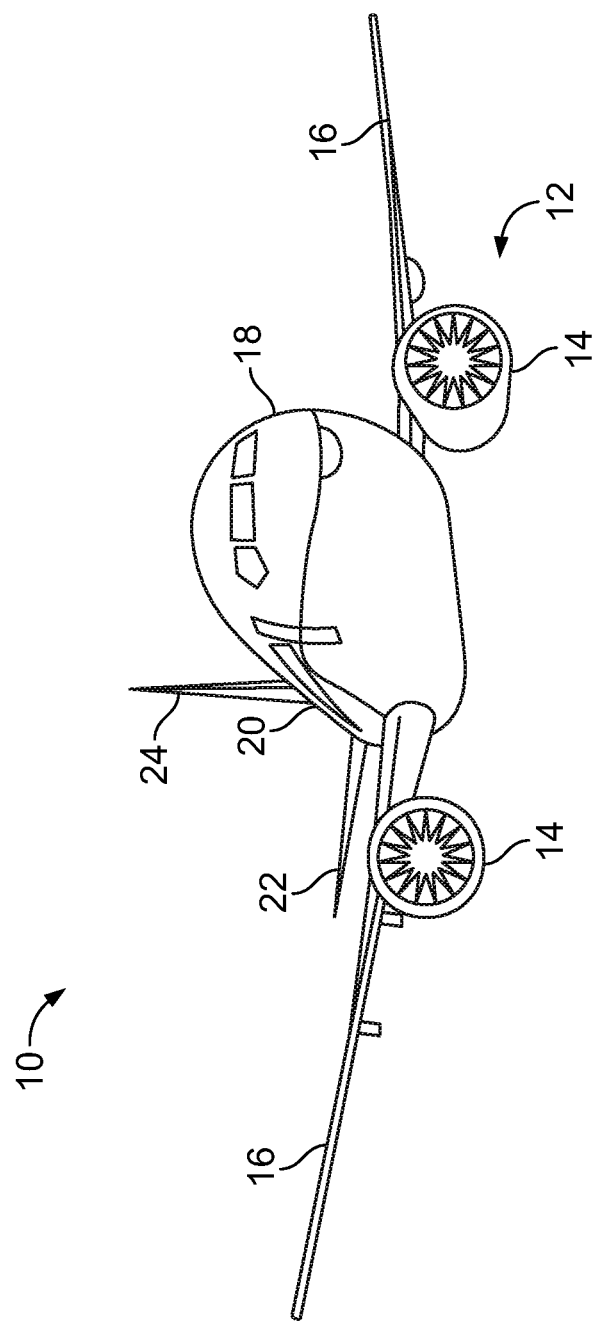
FIG. 1 illustrates a perspective front view of an aircraft, according to an embodiment of the present disclosure.

FIG. 1 illustrates a perspective top view of a vehicle, such as an aircraft 10, according to an embodiment of the present disclosure. The aircraft 10 includes a propulsion system 12 that may include two engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24.

The fuselage 18 of the aircraft 10 defines an internal cabin, which may be defined by interior sidewall panels that connect to a ceiling and a floor. The internal cabin may include a cockpit, one or more work sections (for example, galleys, personnel carry-on baggage areas, and the like), one or more passenger sections (for example, first class, business class, and economy sections), and an aft section in which an aft rest area assembly may be positioned. Overhead stowage bin assemblies may be positioned throughout the internal cabin.

Alternatively, instead of an aircraft, embodiments of the present disclosure may be used with various other vehicles, such as automobiles, buses, locomotives and train cars, seacraft, spacecraft, and the like.

Figure 2A:
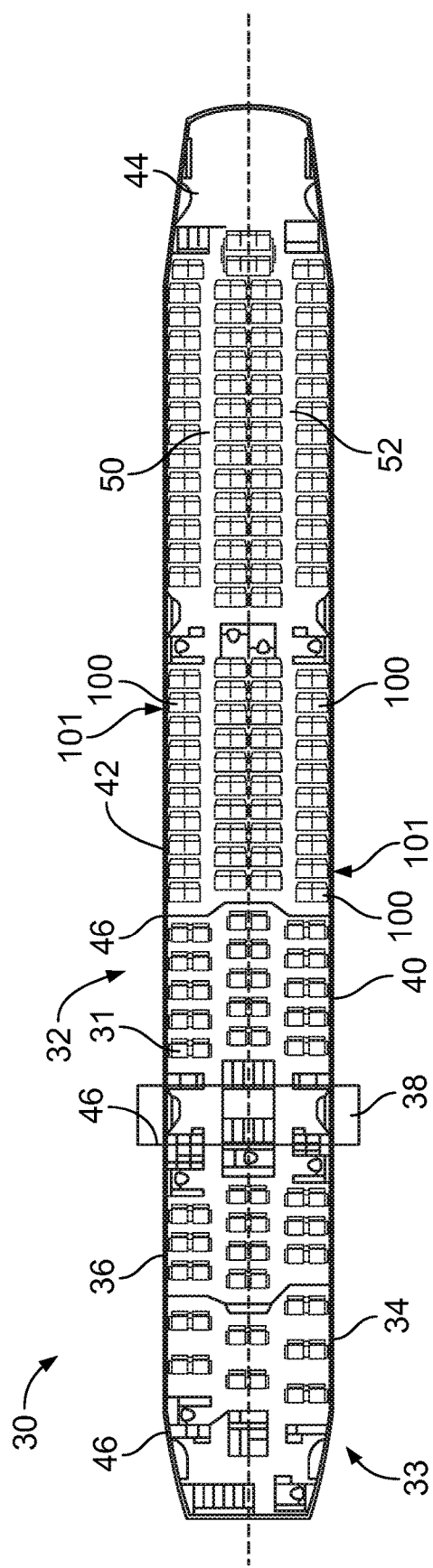
FIG. 2A illustrates a top plan view of an internal cabin of an aircraft.

FIG. 2A illustrates a top plan view of an internal cabin 30 of an aircraft, according to an embodiment of the present disclosure. The internal cabin 30 may be within a fuselage 32 of the aircraft. For example, one or more fuselage walls may define an interior of the internal cabin 30. The interior of the internal cabin 30 is defined by sidewall panels that connect to a ceiling and a floor. The sidewall panels include lateral segments that connect to ceiling segments. The lateral segments define lateral wall portions, while the ceiling segments define at least portions of the ceiling within the internal cabin 30.

The internal cabin 30 includes multiple sections, including a front section 33, a first class section 34, a business class section 36, a front galley station 38, an expanded economy or coach section 40, a standard economy or coach section 42, and an aft section 44, which may include multiple lavatories and galley stations. It is to be understood that the internal cabin 30 may include more or less sections than shown. For example, the internal cabin 30 may not include a first class section, and may include more or less galley stations than shown. Each of the sections may be separated by a cabin transition area 46.

As shown in FIG. 2A, the internal cabin 30 includes two aisles 50 and 52 that lead to the aft section 44. Optionally, the internal cabin 30 may have less or more aisles than shown. For example, the internal cabin 30 may include a single aisle that extends through the center of the internal cabin 30 that leads to the aft section 44.

Seat assemblies 100 are positioned throughout the internal cabin 30. The seat assemblies 100 may be arranged in rows 101.

Figure 2B:
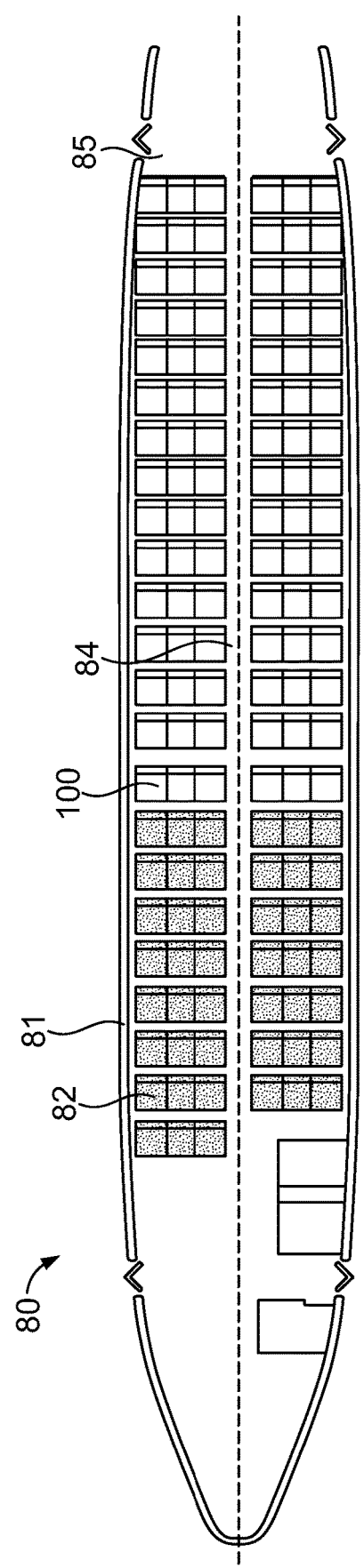
FIG. 2B illustrates a top plan view of an internal cabin of an aircraft.

FIG. 2B illustrates a top plan view of an internal cabin 80 of an aircraft, according to an embodiment of the present disclosure. The internal cabin 80 may be within a fuselage 81 of the aircraft. For example, one or more fuselage walls may define the interior of the internal cabin 80. The internal cabin 80 includes multiple sections, including a main cabin 82 having passenger seat assemblies 100, and an aft section 85 behind the main cabin 82. It is to be understood that the internal cabin 80 may include more or less sections than shown.

The internal cabin 80 may include a single aisle 84 that leads to the aft section 85. The single aisle 84 may extend through the center of the internal cabin 80 that leads to the aft section 85. For example, the single aisle 84 may be coaxially aligned with a central longitudinal plane of the internal cabin 80.

Figure 3:
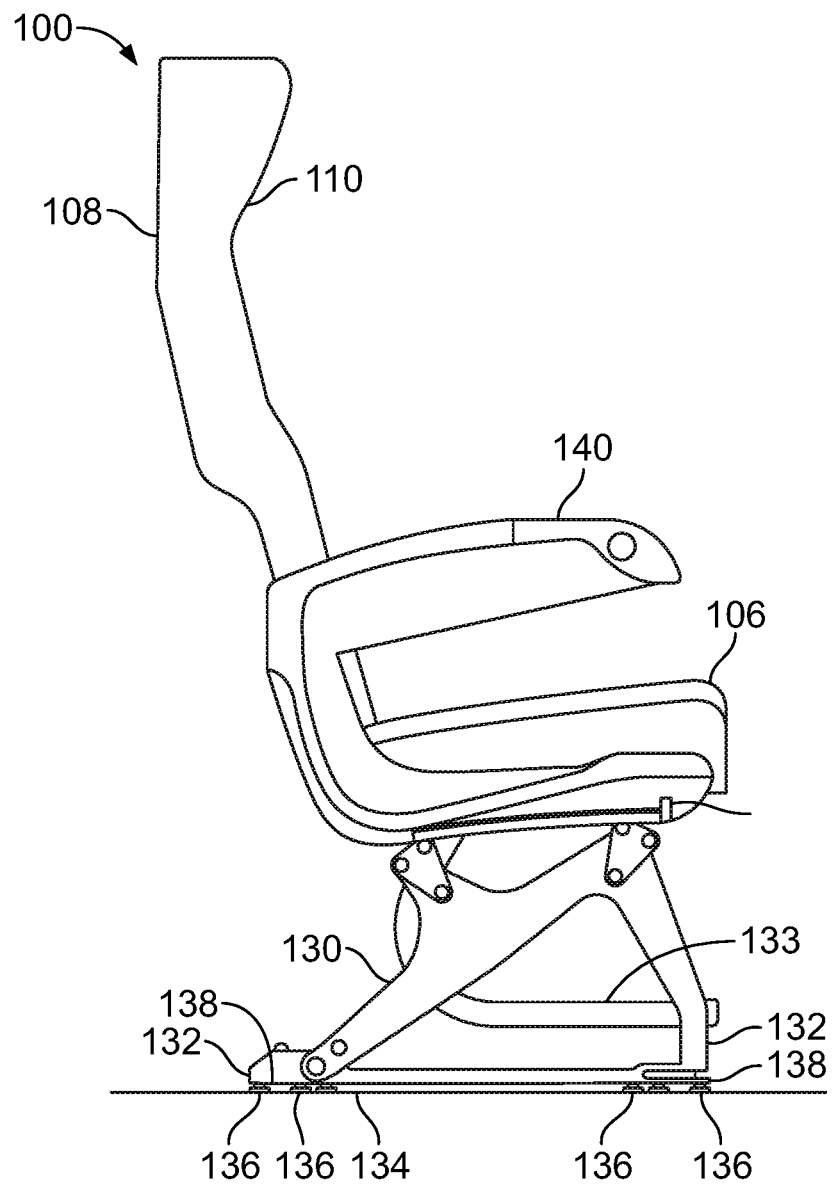
FIG. 3 illustrates a side view of a seat assembly, according to an embodiment of the present disclosure.

FIG. 3 illustrates a side view of a seat assembly 100, according to an embodiment of the present disclosure. The seat assembly 100 is configured to be secured within an internal cabin of a vehicle, such as a commercial aircraft.

The seat assembly 100 includes a base 130, which may include legs 132 that may be secured to seat tracks 134 within a cabin of a vehicle. The legs 132 on a same side of the seat assembly 100 may be connected together by a spanner bar 133. In at least one embodiment, securing studs 136 (such as shear studs) downwardly extend from lower surfaces 138 of the legs 132. The securing studs 136 are securely retained within the seat tracks 134. The seat tracks 134 are configured to securely couple to the securing studs 136 to secure the seat assembly 100 in place. The base 130 supports a seat cushion 106 and a backrest 108, which includes a headrest 110. Arm rests 140 may be pivotally secured to the backrest 108.

The seat assembly 100 may be sized and shaped differently than shown in FIG. 3. The seat assembly 100 may include more or less components than shown in FIG. 3. It is to be understood that the seat assembly 100 shown in FIG. 3 is merely one example of a seat assembly that may be disposed within an internal cabin of a vehicle.

The seat assembly 100 may be coupled together with one or more additional seat assemblies to form a seating module. For example, a seating module may include three seat assemblies. The seating module may include a base that supports all of the seat assemblies of the seating module.

Figure 4:
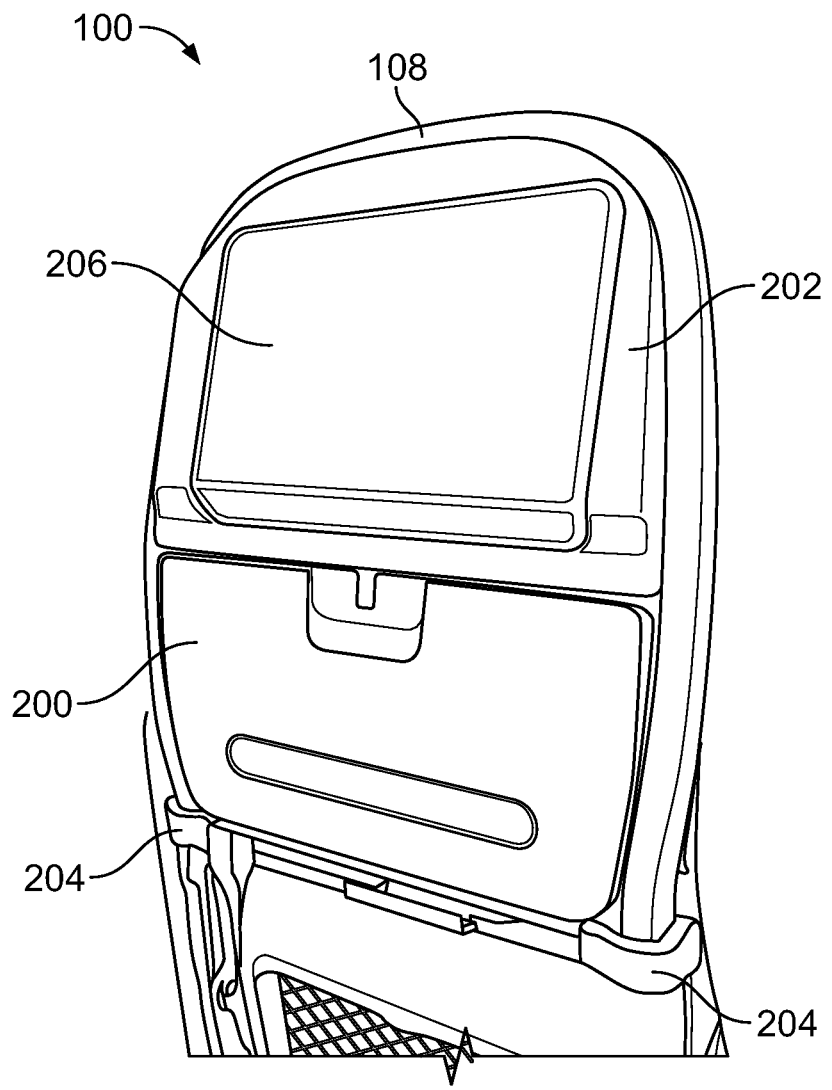
FIG. 4 illustrates a perspective rear view of the seat assembly having a tray table in a stowed position, according to an embodiment of the present disclosure.

FIG. 4 illustrates a perspective rear view of the seat assembly 100 having a tray table 200 in a stowed position (a tray stowed position), according to an embodiment of the present disclosure. The tray table 200 is pivotally coupled to an aft portion 202 of the backrest 108, such as via lateral pivot brackets 204. A component, such as a monitor 206, is coupled to (for example, secured to and/or integrally formed with) an upper portion of the aft portion 202 above the tray table 200. Optionally, the component may be a padded area (such as forward head rest), a device mount (that is configured to support a device, such as a handheld smart phone or table), and/or the like. A literature pocket 210 (shown in FIG. 5) is disposed within the backrest 108, and is covered (or at least has a portion that is covered) by the tray table 200 in the stowed position.

Figure 5:
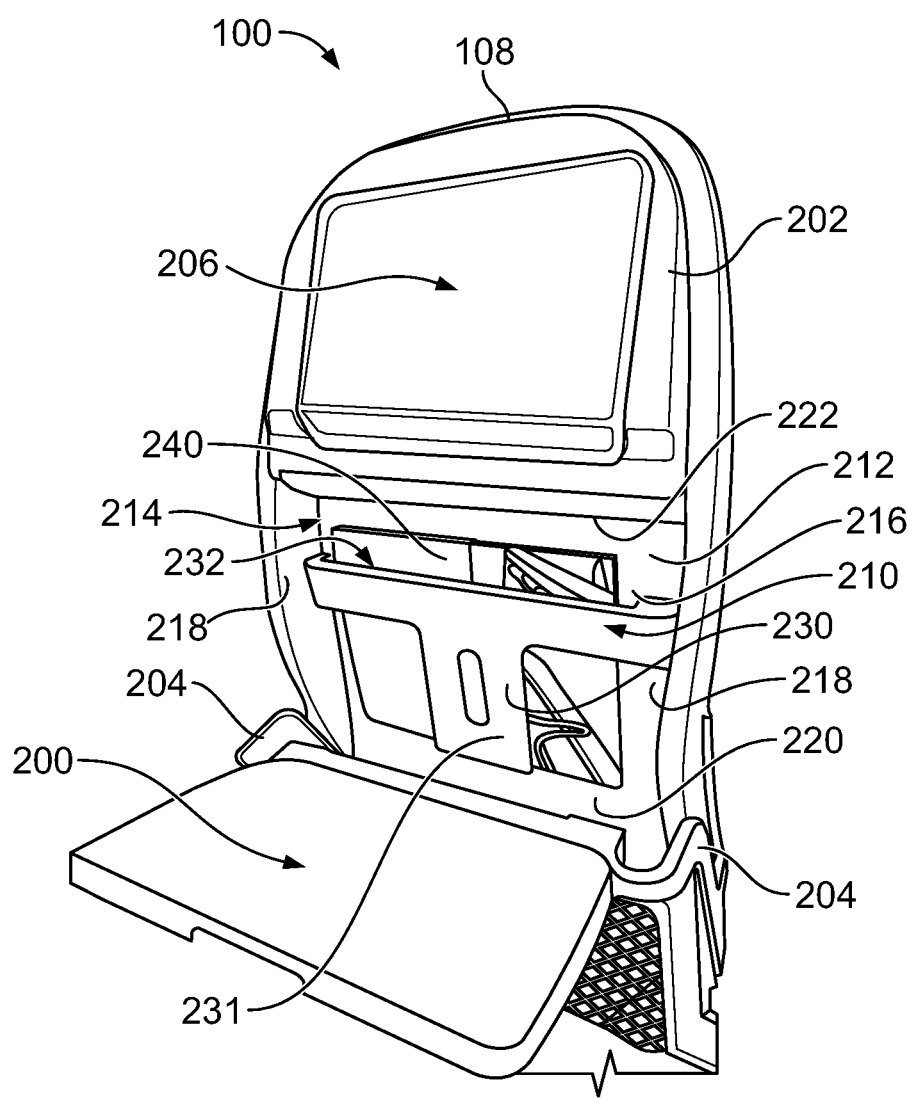
FIG. 5 illustrates a perspective rear view of the seat assembly having the tray table in a deployed position.

FIG. 5 illustrates a perspective rear view of the seat assembly 100 having the tray table 200 in a deployed position (a tray deployed position). In the deployed position, a literature pocket 210 is exposed. The literature pocket 210 is disposed between the tray table 200 in the stowed position (shown in FIG. 4), and a rear surface 212 of the backrest 108. In at least one embodiment, the tray table 200 is a single leaf tray table, in contrast to a bi-folding tray table. Certain individuals may prefer a single leaf tray table to a bi-folding tray table due to aesthetics, and the single leaf tray table being lighter, with less moving parts.

The literature pocket 210 is defined within a volume 214 recessed into the rear surface 212. The volume 214 defines a recessed space 216 defined, at least in part, by interior lateral wall surfaces 218, an interior lower wall surface 220, such as may be proximate to the lateral pivot brackets 204, and an interior upper wall surface 222, such as may be proximate to the component, such as the monitor 206. The rear surface 212 of the backrest 108 includes or otherwise defines the interior lateral wall surfaces, the interior lower wall surface 220, and the interior upper wall surface 222. In at least one embodiment, the interior upper wall surface 222 may be defined by a lower portion of the monitor 206.

A holding bracket 230 spans across the volume 214, such as between the lateral wall surfaces 218, and the interior lower wall surface 220. A retaining cavity 232 is defined between the interior surfaces of the holding bracket 230, the interior lateral wall surfaces 218, the interior lower wall surface 220, and the rear surface 212 of the backrest 108. Literature 240, such as magazines, papers, books, and/or the like, may be positioned within the retaining cavity 232 of the literature pocket 210.

In at least one embodiment, a device support is coupled to the holding bracket 230. For example, a device support can be moveably coupled to a lower portion 231 of the holding bracket 230. The device support is moveable between a stowed position, such that the device support is folded up and/or recessed into the holding bracket 230, and a deployed position, such that the device support extends outwardly from the holding bracket 230. In the deployed position, the device support is able to support a passenger device, such as a handheld smart phone, a tablet, or the like.

Referring to FIGS. 4 and 5, the literature pocket 210 is disposed between the tray table 200 (such as in a stowed position), and the rear surface 212 of the backrest 108, thereby improving living space within the internal cabin and reducing the size and profile of the seat assembly 100. The literature pocket 210 is exposed when the tray table 200 is in the deployed position. The seat assembly 100 having the literature pocket 210 recessed within the backrest 108 between the tray table 200 in the stowed position and the rear surface 212 of the backrest 108 allows for a compact package having a less complicated, thin tray table (that is, a single leaf tray table), and upper literature pocket, and a relatively large monitor. Embodiments of the present disclosure provide seat assemblies that improve living space within a vehicle, and which accommodate large passenger amenities (such as monitors and tray tables).

Referring to FIGS. 3-5, the literature pocket 210 is contained within a profile of the backrest 108. That is, the literature pocket 210 does not outwardly extend below, above, or away from the backrest 108. Further, because the literature pocket 210 is contained within the profile of the backrest 108, the tray table 200 in the stowed position may not outwardly extend past the profile of the backrest 108 in an aft direction. For example, the literature pocket 210 is recessed into the backrest 108 so that the tray table 200 in the stowed position does not obtrude or otherwise extend outwardly past the profile of the backrest 108.

Figure 6:
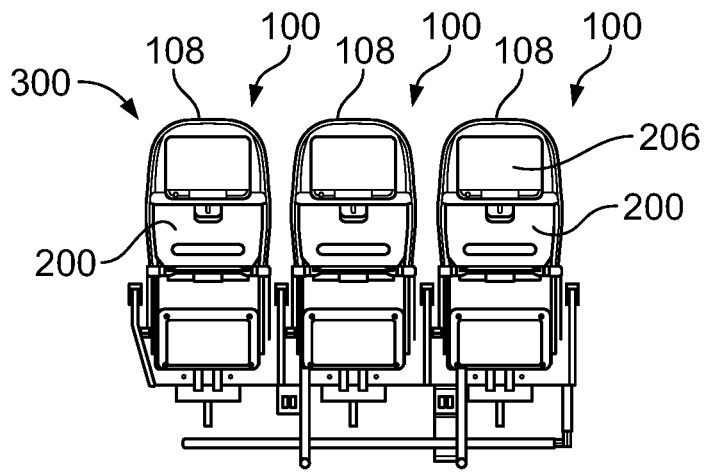
FIG. 6 illustrates a rear view of a seating module including seat assemblies having tray tables in stowed positions, according to an embodiment of the present disclosure.
Figure 7:
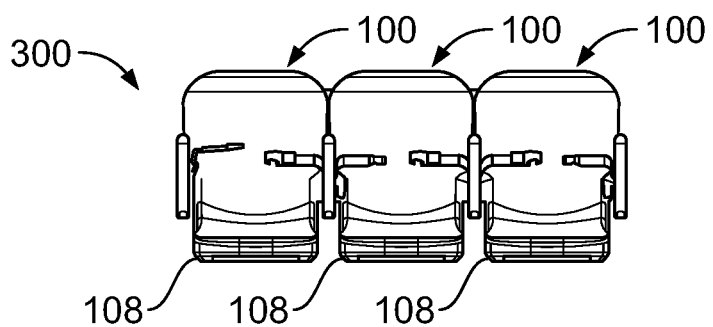
FIG. 7 illustrates a top view of the seating module including the seat assemblies having the tray tables in stowed positions.
Figure 8:
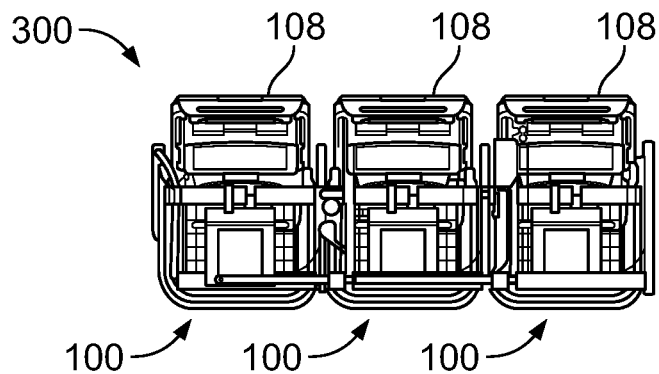
FIG. 8 illustrates a bottom view of the seating module including the seat assemblies having the tray tables in stowed positions.
Figure 9:
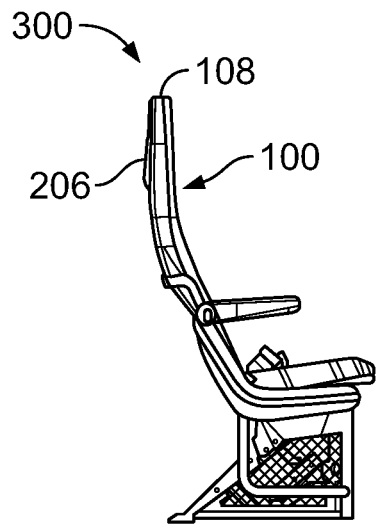
FIG. 9 illustrates a lateral view of the seating module including the seat assemblies having the tray tables in stowed positions.
Figure 10:
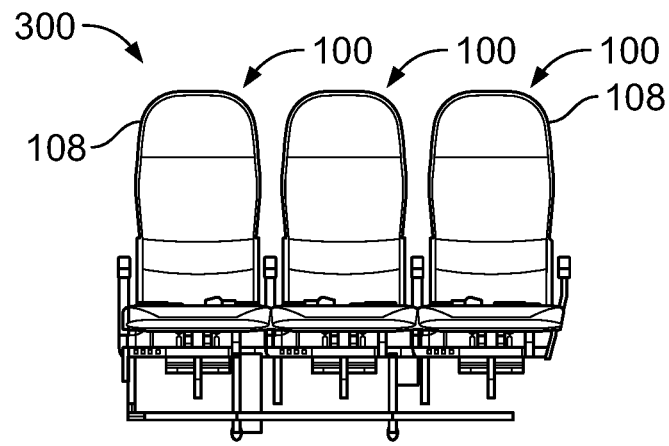
FIG. 10 illustrates a front view of the seating module including the seat assemblies.

FIG. 6 illustrates a rear view of a seating module 300 including seat assemblies 100 having tray tables 200 in stowed positions, according to an embodiment of the present disclosure. FIG. 7 illustrates a top view of the seating module 300 including the seat assemblies 100 having the tray tables 200 in stowed positions. FIG. 8 illustrates a bottom view of the seating module 300 including the seat assemblies 100 having the tray tables 200 in stowed positions. FIG. 9 illustrates a lateral view of the seating module 300 including the seat assemblies 100 having the tray tables 200 in stowed positions. FIG. 10 illustrates a front view of the seating module 300 including the seat assemblies 100.

Referring to FIGS. 6-10, the seating module 300 includes three seat assemblies 100. In at least one other embodiment, the seating module 300 may include less (such as two) or more (such as four) seat assemblies 100. The seat assemblies 100 of the seating module 300 are coupled together and may share common features, such as a legs.

As shown in FIG. 9, in particular, the tray tables 200 in the stowed positions are contained within a profile of the backrest 108. That is, the tray tables 200 in the stowed positions do not obtrude in an aft direction outwardly past the profile of the backrest 108. Alternatively, one or more of the tray tables 200 in the stowed positions may obtrude past a profile of the backrests 108.

Figure 11:
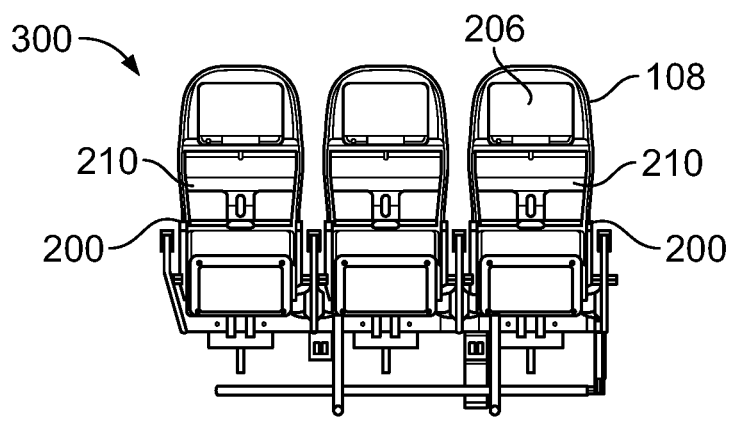
FIG. 11 illustrates a rear view of the seating module including the seat assemblies having the tray tables in deployed positions.

FIG. 11 illustrates a rear view of the seating module 300 including the seat assemblies 100 having the tray tables 200 in deployed positions. FIG. 12 illustrates a top view of the seating module 300 including the seat assemblies 100 having the tray tables 200 in deployed positions. FIG. 13 illustrates a bottom view of the seating module 300 including the seat assemblies having the tray tables 200 in deployed positions. FIG. 14 illustrates a lateral view of the seating module 300 including the seat assemblies 100 having the tray tables 200 in deployed positions.

Referring to FIGS. 11-14, when the tray tables 200 are in the deployed positions, the literature pockets 210 are exposed. The literature pockets 210 are contained within the backrests 108.

Figure 18:
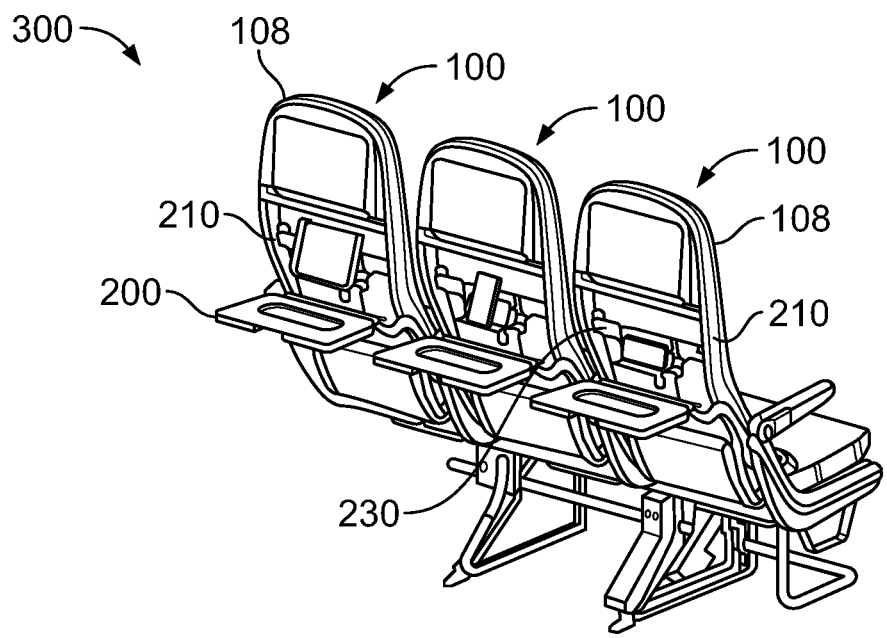
FIG. 18 illustrates a perspective rear view of the seating module including the seat assemblies having the tray tables in deployed positions and devices supported on deployed device supports.

FIG. 15 illustrates a rear view of a seating module 300 including seat assemblies 100 having tray tables 200 in deployed positions, according to an embodiment of the present disclosure. FIG. 16 illustrates a rear view of the seating module 300 including the seat assemblies 100 having the tray tables 200 in deployed positions and devices 400 supported on deployed device supports 402. FIG. 17 illustrates a lateral view of the seating module 300 including the seat assemblies 100 having the tray tables 200 in deployed positions and a device 400 supported on a deployed device support 402. FIG. 18 illustrates a perspective rear view of the seating module 300 including the seat assemblies 100 having the tray tables 200 in deployed positions and devices 400 supported on deployed device supports 402.

The seat assemblies 100 shown in FIGS. 15-18 are similar to those described above, except that the device supports 402 are moveably coupled to the literature pockets 210, such as coupled to the holding brackets 230. The device supports 402 are moveable between stowed positions (support stowed positions), such as folded up against the holding brackets 230 or recessed therein, and deployed positions (support deployed positions). In the deployed positions, the device supports 402 provide levels surfaces on which the devices 400 (such as smart phones, tablets, or the like) can be supported. For example, lower portions of the devices 400 may be supported on the deployed device supports 402, and upper portions of the devices 400 may be propped against the holding brackets 230. Before the tray tables 200 are moved back into the stowed positions, the device supports 402 are moved back into the stowed positions. Optionally, moving the tray tables 200 back into stowed positions may automatically move (such as by folding) the device supports 402 into stowed positions, such as by the tray tables 200 being pivoted into the device supports 402.

In at least one embodiment, the seat assemblies 100 include device supports 402 coupled to the literature pockets 210, such as coupled to the holding brackets 230. The literature pockets 210 may or may not be disposed between the tray tables 200 in the stowed positions and rear surfaces of the backrests 108. Further, the seat assemblies 100 may or may not include components, such as monitors.

Figure 19:
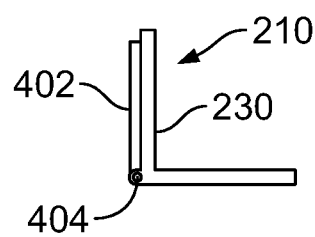
FIG. 19 illustrates a lateral view of a device support in a stowed position relative to a literature pocket, according to an embodiment of the present disclosure.

FIG. 19 illustrates a lateral view of a device support 402 in a stowed position relative to a literature pocket 210, according to an embodiment of the present disclosure. In at least one embodiment, the device support 402 is a panel moveably coupled to the holding bracket 230 of the literature pocket 210. For example, the device support 402 is pivotally coupled to the holding bracket 230 via a pivot axle 404.

In the stowed position, the device support 402 is upwardly folded against and/or into the holding bracket 230. For example, the device support 402 may be folded into a reciprocal channel formed into the holding bracket 230.

Figure 20:
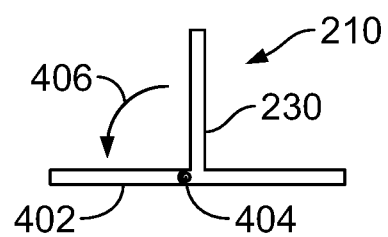
FIG. 20 illustrates a lateral view of the device support in a deployed position relative to the literature pocket.

FIG. 20 illustrates a lateral view of the device support 402 in a deployed position relative to the literature pocket 210. In order to move the device support 402 into the deployed position, an individual grasps a portion of the device support 402 and pivots the device support 402 outwardly from the stowed position in the direction of arc 406.

Figure 21:
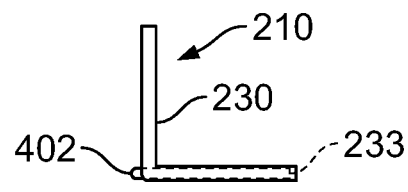
FIG. 21 illustrates a lateral view of a device support in a stowed position relative to a literature pocket, according to an embodiment of the present disclosure.

FIG. 21 illustrates a lateral view of a device support 402 in a stowed position relative to a literature pocket 210, according to an embodiment of the present disclosure. In this embodiment, the device support 402 is slidably retained within a channel 233 formed in a portion of the holding bracket 230.

Figure 22:
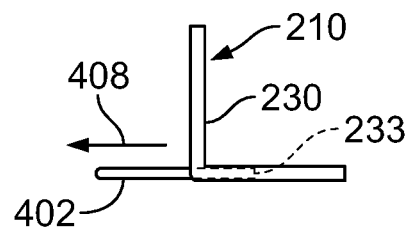
FIG. 22 illustrates a lateral view of the device support in a deployed position relative to the literature pocket.

FIG. 22 illustrates a lateral view of the device support 402 in a deployed position relative to the literature pocket 210. In order to move the device support 402 into the deployed position, an individual grasps an exposed end or handle of the device support 402 and pulls the device support 402 outwardly in a linear direction, such as in the direction of arrow 408.

As described herein, embodiments of the present disclosure provide a compact seat assembly for a vehicle. Further, the seat assembly occupies less space within an internal cabin of a vehicle than currently known seat assemblies. Also, the seat assembly allows for a larger monitor, for example.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A seat assembly for a vehicle, the seat assembly comprising:
    a backrest;
    a tray table moveably coupled to the backrest, wherein the tray table is configured to be moved between a tray stowed position and a tray deployed position;
    a component coupled to the backrest; and
    a literature pocket formed in the backrest, wherein the literature pocket is disposed between the tray table in the tray stowed position and a rear surface of the backrest, wherein the literature pocket comprises a holding bracket including a cross beam, and a lower portion extending downwardly from the cross beam.

2. The seat assembly of claim 1, wherein the literature pocket is below the component.

3. The seat assembly of claim 1, wherein the component comprises a monitor above the literature pocket.

4. The seat assembly of claim 1, wherein the literature pocket is covered by the tray table in the tray stowed position, and wherein the literature pocket is exposed when the tray table is in the tray deployed position.

5. The seat assembly of claim 1, wherein the tray table is a single leaf tray table.

6. The seat assembly of claim 1, wherein the literature pocket is defined within a volume recessed into a rear surface of the backrest.

7. The seat assembly of claim 6, wherein the volume is defined, at least in part, by interior lateral wall surfaces, an interior lower wall surface, and an interior upper wall surface of the rear surface of the backrest.

8. The seat assembly of claim 7, wherein the lower portion downwardly extends from a central portion of the cross beam wherein a retaining cavity is defined between interior surfaces of the holding bracket, the interior lateral wall surfaces, the interior lower wall surface, and the rear surface of the backrest.

9. The seat assembly of claim 1, wherein the literature pocket is contained within a profile of the backrest.

10. The seat assembly of claim 1, wherein the tray table in the tray stowed position does not extend outwardly past a profile of the backrest.

11. The seat assembly of claim 1, further comprising a device support moveably coupled to the lower portion of the literature pocket, wherein the device support is moveable between a support stowed position and a support deployed position that is configured to support a device.

12. The seat assembly of claim 11, wherein the device support is pivotally coupled to the literature pocket.

13. The seat assembly of claim 11, wherein the device support is slidably coupled to the literature pocket.

14. A seat assembly for a vehicle, the seat assembly comprising:
    a backrest;
    a tray table moveably coupled to the backrest, wherein the tray table is configured to be moved between a tray stowed position and a tray deployed position;
    a literature pocket, wherein the literature pocket is disposed between the tray table in the tray stowed position and a rear surface of the backrest; and
    a device support moveably coupled to the literature pocket, wherein the device support is moveable between a support stowed position and a support deployed position that is configured to support a device.

15. The seat assembly of claim 14, wherein the device support is pivotally or slidably coupled to the literature pocket.

16. The seat assembly of claim 14, further comprising a component coupled to the backrest, wherein the literature pocket is below the component.

17. The seat assembly of claim 14, wherein the literature pocket is covered by the tray table in the tray stowed position, and wherein the literature pocket is exposed when the tray table is in the tray deployed position.

18. The seat assembly of claim 14, wherein the literature pocket is defined within a volume recessed into a rear surface of the backrest.

19. The seat assembly of claim 14, wherein the literature pocket comprises a holding bracket including a cross beam, and a lower portion extending downwardly from the cross beam.

20. A seat assembly for a vehicle, the seat assembly comprising:
- a backrest;
- a single leaf tray table moveably coupled to the backrest, wherein the single leaf tray table is configured to be moved between a tray stowed position and a tray deployed position;
- a monitor coupled to the backrest;
- a literature pocket formed in the backrest below the monitor, wherein the literature pocket is defined within a volume recessed into a rear surface of the backrest, wherein the literature pocket is disposed between the single leaf tray table in the tray stowed position and a rear surface of the backrest, wherein at least a portion of the literature pocket is covered by the single leaf tray table in the tray stowed position, and wherein the literature pocket is exposed when the single leaf tray table is in the tray deployed position; and
- a device support moveably coupled to the literature pocket, wherein the device support is moveable between a support stowed position and a support deployed position that is configured to support a device.

* * * * *